United States Patent [19]

Glenn

[11] Patent Number: 4,626,920

[45] Date of Patent: * Dec. 2, 1986

[54] SOLID STATE LIGHT MODULATOR STRUCTURE

[75] Inventor: William E. Glenn, Fort Lauderdale, Fla.

[73] Assignee: New York Institute of Technology, Old Westbury, N.Y.

[*] Notice: The portion of the term of this patent subsequent to Jul. 16, 2002 has been disclaimed.

[21] Appl. No.: 574,929

[22] Filed: Jan. 30, 1984

[51] Int. Cl.$^4$ .............................................. H04N 5/74
[52] U.S. Cl. ................................... 358/234; 358/233; 340/763; 350/360
[58] Field of Search ................ 358/234, 233; 350/360, 350/361, 355; 340/763, 764; 427/88

[56] References Cited

U.S. PATENT DOCUMENTS 3,882,271  5/1975  Glenn .................................. 358/233
4,119,368  10/1978  Yamazaki ........................... 350/360

*Primary Examiner*—James J. Groody
*Assistant Examiner*—E. Anne Toth

[57] ABSTRACT

The disclosure is directed to improvements in an apparatus for generating an image from an input video signal. A semiconductor device is provided, the device having an array of spaced charge storage electrodes thereon. An elastomer layer is disposed on the semiconductor device, over the array of charge storage electrodes. The elastomer layer has a thickness in the range between one-tenth and one times the average spacing between charge storage electrodes. At least one conductive layer is disposed over the elastomer layer. The semiconductor device is responsive to the input video signal to selectively apply voltages between the charge storage electrodes and the at least one conductive layer to cause deformations of the conductive layer and the elastomer layer. An optical subsystem is provided for converting deformations of the at least one conductive layer into an image, for example using a Schleirin optical system. In a preferred embodiment, a plastic pellicle layer is disposed between the elastomer layer and the at least one conductive layer. This plastic pellicle layer is useful during the fabrication of the device, and also serves to protect the at least one conductive layer against elements in the elastomer layer that might have a degrading effect thereon.

26 Claims, 3 Drawing Figures

SOLID STATE LIGHT MODULATOR STRUCTURE

BACKGROUND OF THE INVENTION

This invention relates to video display systems and, more particularly, to improvements in the type of video display which employs a deformable material having deformations that depend upon a stored charge pattern on a solid state device and an optical subsystem for converting the deformations into a viewable image. The subject matter of this application is related to the subject matter of my copending U.S. application Ser. No. 574,928 (now U.S. Pat. No. 4,529,620) filed of even date herewith and assigned to the same assignee as the present application.

In recent years there have been developed techniques for displaying video information by storing a charge pattern representative of a video frame in a frame store and utilizing the charge pattern to modify a characteristic of a material. The modified characteristic of the material is then used to obtain a viewable image. In my U.S. Pat. No. 3,882,271, there is disclosed an apparatus wherein a charge pattern on a special semiconductor frame store is used to obtain deformations of a deformable material. The deformable material is disposed between an array of electrodes on the surface of the semiconductor device and a thin conductive layer which serves as both a common electrode and a light reflective layer. The deformable material and the thin conductive layer are deformed in response to the charge pattern on the array of electrodes with respect to the conductive layer. An optical subsystem, such as a Schleiren optical system, is then utilized to convert the pattern of deformations (or "ripples") in the thin conductive layer into a viewable image.

An important aspect of the described type of system is the operation of the conductive and reflective layer which is mounted on the deformable layer and must reliably and repeatably provide precise patterns of deformations in the reflective layer which correspond to the charge pattern on the array of electrodes. It has been found that the materials used for the deformable and conductive layers, as well as their dimensions, have a profound effect upon operating characteristics, and prior attempts to make solid state light modulators have met with one or more of the following deficiencies: insufficient sensitivity to the applied voltages; inadequate response characteristics as a function of time; and/or instability over the short and long term.

It is an object of the present invention to provide a solid state light modulator structure which overcomes these problems.

SUMMARY OF THE INVENTION

The present invention is directed to improvements in an apparatus for generating an image from an input video signal. A semiconductor device is provided, the device having an array of spaced charge storage electrodes thereon. An elastomer layer is disposed on the semiconductor device, over the array of charge storage electrodes. The elastomer layer has a thickness in the range between one-tenth and one times the average center-to-center spacing between adjacent active charge storage electrodes. At least one conductive layer is disposed over the elastomer layer. The semiconductor device is responsive to the input video signal to selectively apply voltages between the charge storage electrodes and the at least one conductive layer to cause deformations of the conductive layer and the elastomer layer. An optical subsystem is provided for converting deformations of the at least one conductive layer into an image, for example using a Schleirin optical system.

Preferably, a plastic pellicle layer is disposed between the elastomer layer and the at least one conductive layer. This plastic pellicle layer is useful during the fabrication of the device, and also serves to protect the at least one conductive layer against elements in the elastomer layer that might have a degrading effect thereon. In a preferred embodiment, the at least one conductive layer comprises a thin layer of gold, which is applied over the plastic pellicle layer, and a thin layer of silver, which is applied over the gold layer. The gold layer applies very uniformly on the pellicle, and provides an excellent conductive surface and base for the silver layer. The silver layer applies easily and uniformly over the gold layer and provides an excellent light reflector, as is necessary in conjunction with the optical subsystem.

Further features and advantages of the invention will become more readily apparent from the following detailed description when taken in conjunction with the accompanying drawings.

DESCRIPTION OF THE PREFERRED EMBODIMENT

Figure 1:
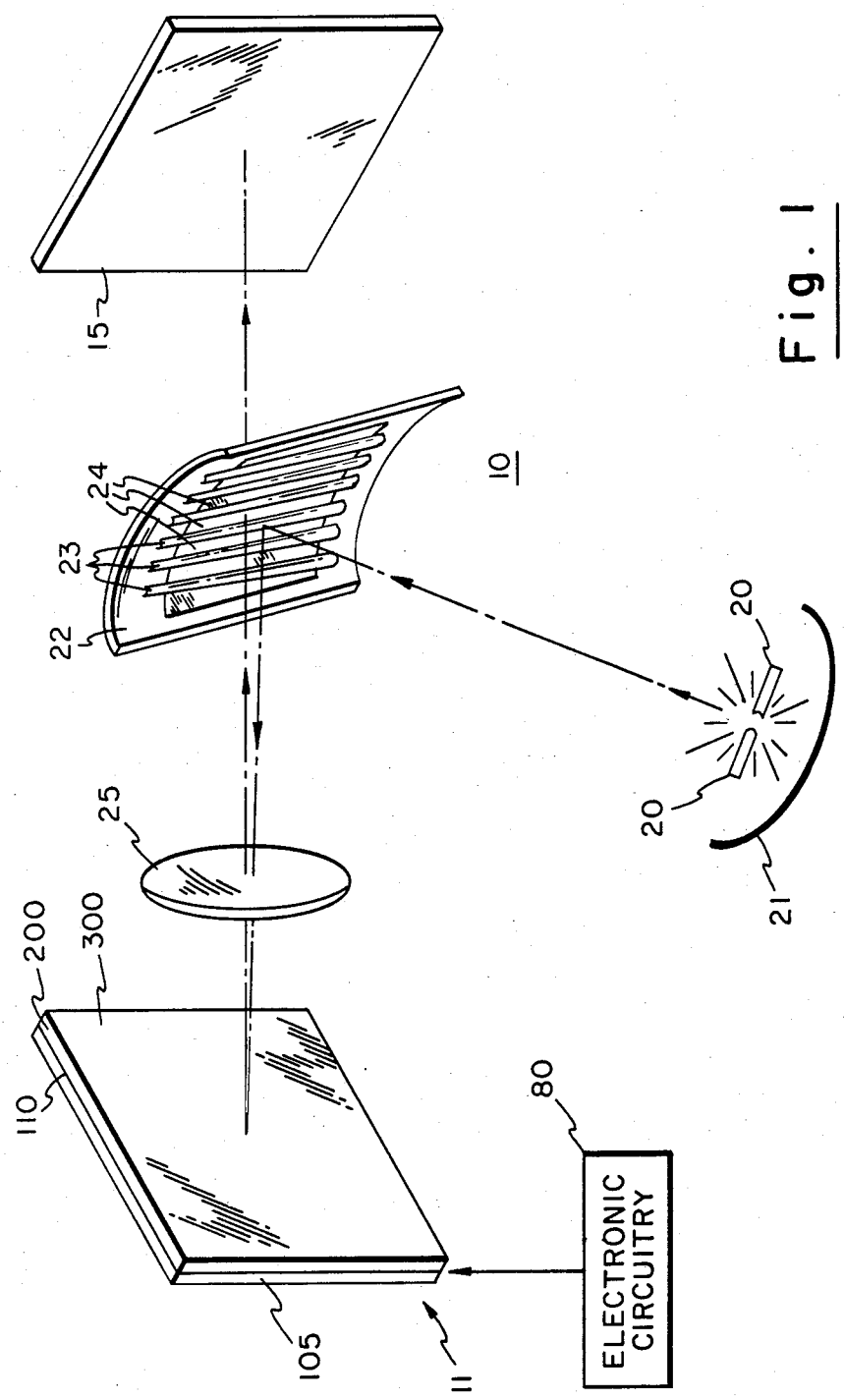
FIG. 1 is a block diagram, partially in schematic form, of a system for displaying images and which includes improvements in accordance with the invention and as described in conjunction with the subsequent FIGURES.

Referring to FIG. 1, there is shown a simplified schematic diagram of an apparatus 10 which includes improvements in accordance with an embodiment of the invention. A solid state light modulator structure 100 includes a semiconductor substrate 105 having an array of semiconductor controlled storage units formed in a surface 110 thereof, and a layer of deformable material 200 which covers the surface 110. At least one reflective layer 300 of conductive material is disposed over the deformable layer 200. The semiconductor controlled storage unit array, and associated circuitry 80, receives and samples a video signal, the samples ultimately being stored as a charge pattern as between electrodes on the surface 110 of semiconductor 105 and the layer 300, which serves as a common electrode. The electric fields associated with the charge pattern result in forces which deform the deformable material 200 so that information is contained in the reflective layer 300 in the form of depressions or ripples which are similar to a phase diffraction grating. This information is then displayed on a screen 15, such as by using a Schlieren type of optical system.

The optical system depicted in FIG. 1 is of the type disclosed in my U.S. Pat. No. 3,084,590. In this system arc electrodes 20 generate an intense light source that is directed by a curved mirror 21 over a masking system 22 which includes a plurality of reflecting bars 23 separated by transparent areas or slits 24. The masking system 22 is positioned so that the light reflected from the bars 23 is transmitted toward a lens 25 where it is collimated into relatively parallel rays. These rays are incident on the deformed reflective surface 300 and are reflected back through the lens 25 toward the masking system 22. If, at a given instant, there were no depressions on the surface 300 to divert the light rays, the rays effectively emanating from each bar 23 would be focused by lens 25 on a bar on the opposite side from which it originated, and no light would be incident on the screen 15. However, if there are depressions in the surface 300 they will act as diffraction gratings and some light will be diffracted and ultimately pass through the slits 24. The portion of a light ray transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15.

Figure 2:
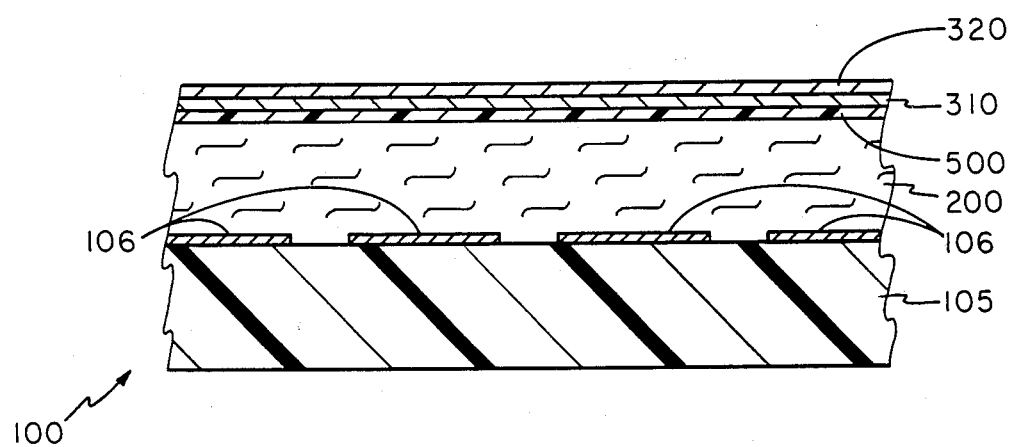
FIG. 2 is a cross-sectional view of the semiconductor device of the FIG. 1 embodiment, including an elastomer layer, pellicle layer, and conductive layers in accordance with improvements of the invention.

Referring to FIG. 2, there is shown a cross-sectional view of the solid state light modulator 100 in accordance with an embodiment of the invention, and which had been shown generally in the FIG. 1 diagram. The basic structure of the semiconductor substrate 105 and an array of semiconductor controlled storage units formed therein, each including a display electrode 106, is known in the art and is not, per se, a feature of the present invention. Reference can be made, for example, to the above referenced U.S. Pat. No. 3,084,590. With regard to the manner in which the video signal can be sampled and coupled to the display electrodes, reference can also be made, for example, to my copending U.S. patent application Ser. No. 557,941, filed Dec. 5, 1983, and assigned to the same assignee as the present application. A deformable elastomer layer 200 is disposed on the semiconductor device 105, and covers the display electrodes 106 thereof, as well as any areas of surface 110 between the display electrodes. It will be understood that a thin protective oxide layer (not shown) can be provided over the display region electrodes during manufacture of the semiconductor device, if desired. Disposed over the top surface of the elastomer 200 layer is a plastic pellicle layer 500. At least one, and preferably two conductive metal layers are disposed over the pellicle layer 500. In this embodiment these layers are a gold layer 310 which is covered by a silver layer 320.

In the present embodiment, the elastomer layer 200 is a silicone gel layer, for example of the type sold by Dow Corp. or General Electric Corp. under the trade names Dow Gel 3-6527 or G.E. RTV-6157, respectively. The silicone gel layer 200, can be applied by dipping of the semiconductor device into silicone gel and then drawing it out. Alternatively, the silicone gel can be applied to the surface of the semiconductor device and then a doctor blade used to obtain a uniform surface, or the material can be applied and then distributed by spinning the device.

It is important that the elastomer layer be neither too limber nor too stiff. It is important that the elastomer layer be neither too limber nor too stiff. The compliance of the gels are normally measured with a universal penetrometer. This has a shaft of 6.35 mm diameter and a weight of 19.5 gms. The penetration is measured in millimeters. These gels have a penetration that ranges from 3 mm to 30 mm. The thickness of the elastomer layer affects the sensitivity of the solid state light modulator, since it determines the distance (and therefore the force for a given electrical charge) between the display electrodes 106 and the common electrode (310 and 320 in FIG. 2) and is also determinative of the volume of deformable material on which the common electrode "floats". Applicant has discovered that the thickness of the elastomer layer should be in the range between one-tenth and one times the average center-to-center spacing between adjacent active charge storage electrodes 106, and preferably about one-half such spacing. For an average electrode spacing of about 20 microns, the elastomer layer thickness should be between 2 and 20 microns, and preferably around 10 microns.

In the present embodiment, the pellicle layer 500 is formed separately by dissolving a cellulose nitrate material in a solvent, such as amylacetate and ethyl acetate, and then dropping the solution on water. After drying, the pellicle can be laid over the elastomer layer 200. The pellicle serves two purposes. First, applicant has found that residual oils and/or other constituents invariably present in the silicone gel material render it difficult to apply an appropriate thin uniform layer of conductive metal, such as gold, directly on top of the elastomer layer. Second, after application of the metal layer, the pellicle serves to isolate the metal layer from components of the elastomer that could attack and degrade the metal layer or layers disposed thereon. The pellicle layer should be sufficiently thin so as not to add undue stiffness to the light modulator structure, a thickness of less than about two microns being preferred.

In the present embodiment, a gold layer 310 is applied over the pellicle layer by evaporation, such as by placing the structure in a vacuum evaporation chamber and heating a gold source with a filament to obtain a layer of suitable thickness. A silver layer is then applied in the same way. The thicknesses of the gold and silver layers are preferably in the ranges 50 to 100 Angstroms and 100 to 1000 Angstroms, respectively. While a single layer could be used as the common electrode and reflective layer (e.g. layer 300 in FIG. 1), the silver layer does not evaporate directly onto the plastic pellicle layer with sufficient uniformity. The initial evaporation of gold provides an excellent base layer upon which a uniform and highly reflective layer of silver can be evaporated. It will be understood that alternative techniques of applying the one or more conductive layers can be employed, for example sputtering or electroless deposition.

Figure 3:
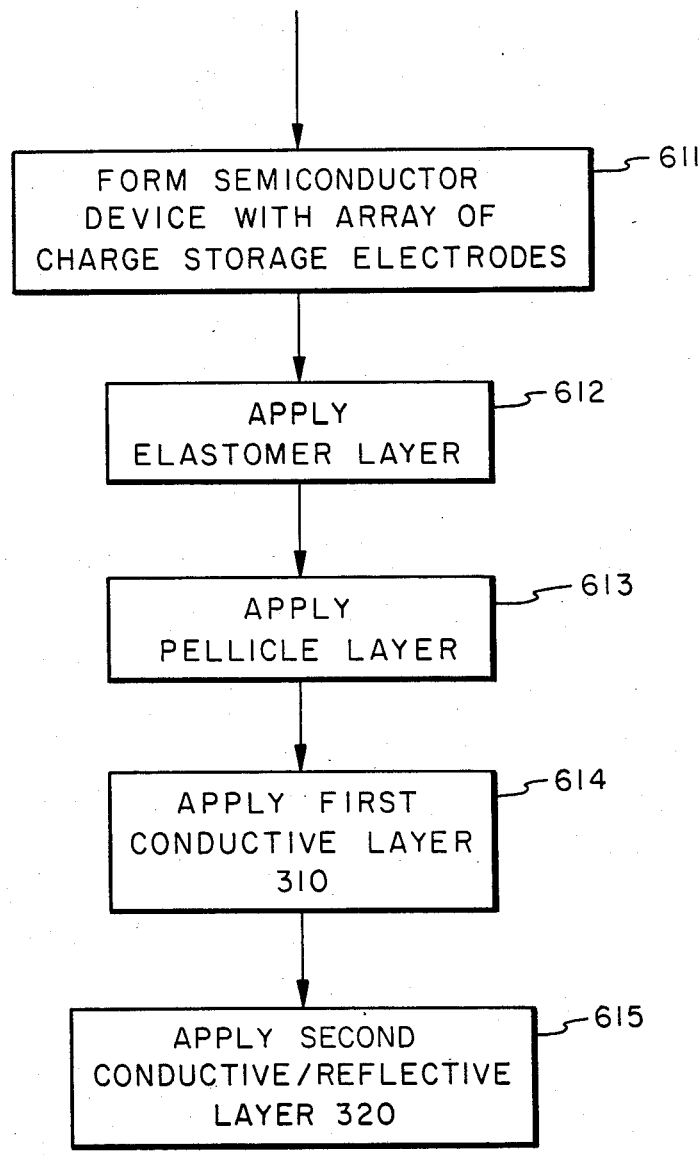
FIG. 3 is a diagram illustrating the steps used in fabricating the solid-state light modulator structure, including the semiconductor device, elastomer layer, pellicle layer, and conductive layers in accordance with a preferred embodiment of the invention.

Referring to FIG. 3, there is shown a diagram of the method steps for making the solid state light modulator in accordance with the described embodiment. The block 611 represents the formation of the semiconductor device having an array of charge storage electrodes on a surface thereof. The block 612 represents the application of the elastomer layer to the semiconductor surface, and the block 613 represents the application of the pellicle layer, as described. The blocks 614 and 615 then represent the application of the conductive and reflective layers 310 and 320, as described.

I claim:

1. Apparatus for generating an image from an input video signal, comprising:
   a semiconductor device having an array of spaced charge storage electrodes thereon;

an elastomer layer disposed on said semiconductor device over said array of electrodes, and having a thickness in the range between one-tenth and one times the average spacing between charge storage electrodes;

at least one conductive layer disposed over said elastomer layer;

said semiconductor device being responsive to said input video signal to selectively apply voltages between said charge storage electrodes and said at least one conductive layer to cause deformations of the metal layer and the elastomer layer; and an optical subsystem for converting deformations of said at least one conductive layer into an image.

2. Apparatus as defined by claim 1, wherein the thickness of said elastomer layer is about one-half the average spacing between charge storage electrodes.

3. Apparatus as defined by claim 1, wherein the elastomer layer has a compliance in the range 3 to 30 mm penetration on a universal penetrometer.

4. Apparatus as defined by claim 2, wherein the elastomer layer has a compliance in the range 3 to 30 mm penetration on a universal penetrometer.

5. Apparatus as defined by claim 1, wherein said elastomer layer comprises silicone gel.

6. Apparatus as defined by claim 2, wherein said elastomer layer comprises silicone gel.

7. Apparatus as defined by claim 3, wherein said elastomer layer comprises silicone gel.

8. Apparatus as defined by claim 1, wherein a plastic pellicle layer is disposed between said elastomer layer and said at least one conductive layer.

9. Apparatus as defined by claim 2, wherein a plastic pellicle layer is disposed between said elastomer layer and said at least one conductive layer.

10. Apparatus as defined by claim 7, wherein a plastic pellicle layer is disposed between said elastomer layer and said at least one conductive layer.

11. Apparatus as defined by claim 8, wherein said pellicle thickness is less than about two microns.

12. Apparatus as defined by claim 9, wherein said pellicle thickness is less than about two microns.

13. Apparatus as defined by claim 10, wherein said pellicle thickness is less than about two microns.

14. Apparatus as defined by claim 3, wherein said at least one conductive layer comprises a layer of silver covering a layer of gold.

15. Apparatus as defined by claim 7, wherein said at least one conductive layer comprises a layer of silver covering a layer of gold.

16. Apparatus as defined by claim 10, wherein said at least one conductive layer comprises a layer of silver covering a layer of gold.

17. Apparatus as defined by claim 13, wherein said at least one conductive layer comprises a layer of silver covering a layer of gold.

18. For use in an apparatus for generating an image from an input video signal, the apparatus including a semiconductor device having an array of spaced charge storage electrodes thereon; an elastomer layer disposed on said semiconductor device over said array of electrodes; a conductive layer disposed over said elastomer layer; said semiconductor device being responsive to said input video signal to selectively apply voltages between said charge storage electrodes and said conductive layer to cause deformations of the conductive layer and the elastomer layer; and an optical subsystem for converting deformations of the conductive layer into an image; the improvement comprising: said elastomer layer having a thickness in the range between one-tenth and one-times the average spacing between said charge storage electrodes.

19. Apparatus as defined by claim 18, wherein the thickness of said elastomer layer is about one-half the average spacing between charge storage electrodes.

20. Apparatus as defined by claim 18, wherein the elastomer layer has a compliance in the range 3 to 30 mm penetration on a universal penetrometer.

21. Apparatus as defined by claim 19, wherein the elastomer layer has a compliance in the range 3 to 30 mm penetration on a universal penetrometer.

22. Apparatus as defined by claim 20, wherein said elastomer layer comprises silicone gel.

23. Apparatus as defined by claim 21, wherein said elastomer layer comprises silicone gel.

24. Apparatus for generating an image from an input video signal, comprising:

a semiconductor device having an array of spaced charge storage electrodes thereon;

an elastomer layer of silicone gel disposed on said semiconductor device over said array of electrodes;

a plastic pellicle layer disposed over said elastomer layer;

at least one conductive metal layer disposed over said elastomer layer;

said semiconductor device being responsive to said input video signal to selectively apply voltages between said charge storage electrodes and said at least one metal layer to cause deformations of the metal layer and the elastomer layer; and an optical subsystem for converting deformations of said at least one conductive layer into an image.

25. Apparatus as defined by claim 24, wherein said at least one metal layer comprises a layer of silver covering a layer of gold.

26. Apparatus as defined by claim 24, wherein said elastomer layer has a compliance in the range 3 to 30 mm penetration on a universal penetrometer.

* * * * *